(12) United States Patent
Kruse et al.

(10) Patent No.: US 7,993,086 B2
(45) Date of Patent: Aug. 9, 2011

(54) HIGH CROWN ANTI-ROTATION BOLT

(75) Inventors: Brian Kruse, Goode, VA (US); Brian Ring, Appomattox, VA (US); Jeff Enneking, Forest, VA (US)

(73) Assignee: Areva NP Inc., Lynchburg, VA (US)

( * ) Notice: Subject to any disclaimer, the term of this patent is extended or adjusted under 35 U.S.C. 154(b) by 468 days.

(21) Appl. No.: 12/157,787

(22) Filed: Jun. 14, 2008

(65) Prior Publication Data

US 2009/0311072 A1    Dec. 17, 2009

(51) Int. Cl.
*F16B 39/32* (2006.01)
(52) U.S. Cl. ......... 411/141; 411/114; 411/116; 411/979
(58) Field of Classification Search .................. 411/114, 411/115, 166, 949, 962, 127, 128, 979, 141, 411/142, 121
See application file for complete search history.

(56) References Cited

U.S. PATENT DOCUMENTS

| | | | | |
|---|---|---|---|---|
| 801,714 A * | 10/1905 | Ferrin | ............................ | 411/326 |
| 3,419,057 A * | 12/1968 | Hogan | ............................ | 411/125 |
| 4,185,937 A * | 1/1980 | Anderson | ...................... | 403/316 |
| 4,303,476 A * | 12/1981 | Leclercq | ......................... | 376/446 |
| 4,534,101 A * | 8/1985 | Rosan, Jr. | ......................... | 29/432 |
| 4,668,469 A * | 5/1987 | Widener | ....................... | 376/446 |
| 4,711,760 A | 12/1987 | Blaushild | | |
| 4,812,094 A * | 3/1989 | Grube | ........................... | 411/134 |
| 5,606,753 A * | 3/1997 | Hashimoto | ....................... | 411/7 |
| 5,683,216 A * | 11/1997 | Erbes | ............................. | 411/120 |
| 5,725,344 A * | 3/1998 | Petrella | ......................... | 411/299 |
| 6,164,886 A | 12/2000 | Matarazzo et al. | | |

* cited by examiner

*Primary Examiner* — Flemming Saether
(74) *Attorney, Agent, or Firm* — Sean P. O'Hanlon, Esq., PLLC

(57) ABSTRACT

The present disclosure shows an anti-rotation bolt for fastening reactor plates to prevent subsequent SCC problems wherein the bolt head has a circumferential series of anti-rotation tabs extending from the head of the bolt which are moved in by a restrainer cone which is placed on top of the bolt to allow its insertion into the plates and is removed for locking the tabs into detents formed in one of the plates to provide anti-rotation. The cone is again moved over the tabs during the removal of same leaving the bolt undamaged and fit for reuse.

15 Claims, 4 Drawing Sheets

DETAIL C

DETAIL B

SECTION Y-Y

SECTION Z-Z

DETAIL A

# HIGH CROWN ANTI-ROTATION BOLT

BACKGROUND OF THE INVENTION

1. Field of the Invention

The present invention relates generally to a bolt for fastening two structural members together and more particularly to a bolt having an integral locking member to prevent rotation of the bolt.

2. Description of the Prior Art

In the nuclear power industry there is serious concern of SCC (Stress Corrosion Cracking) and IASCC (Irradiation Assisted Stress Corrosion Cracking) failures of threaded bolts/fasteners having external threads in aqueous environments.

There is also a concern of the threaded fastener losing its pre-load and counter-rotating (backing out). Historically the solution to prevent counter-rotation and loss of pre-load was the use of a locking cup (either integral to the fastener head or two-piece) which is mechanically deformed (crimped) into a detent in the counter-bore wall of the part to be fastened. Such mechanical deformation produces permanent strain and residual stresses which increase the risk of SCC. The resultant use of this methodology is a SCC susceptible fastener that requires a two step installation process (torque, crimp) for installation in nuclear containment. The process is time consuming and hence expensive and also presents risk due to the possibility of parts falling into the reactor.

Further details and examples of such prior art bolts presently used in the nuclear power industry may be found in at least the following U.S. Patents wherein U.S. Pat. No. 4,711,760 issued to Blaushild teaches the use of a bolt to secure two reactor plates and which has a retainer cap screwed over the inserted bolt to prevent counter-rotation and U.S. Pat. No. 6,164,886 issued to Matarazzo et al. which also teaches a retainer bolt for securing two reactor plates while preventing anti-rotation thereof. In the Matarazzo patent his is done by forming a series of circumferential detents in the plate member and providing the bolt head with a deformable circumferential crown which is deformed to fit into the member's detents. This locks the bolt to the member and prevents counter-rotation.

Clearly such bolts while preventing counter-rotation are not capable of being removed to check or replace the parts they are holding together and then being reused.

SUMMARY OF THE INVENTION

The present invention solves the problems associated with prior art bolt/screws used in the nuclear power industry and others by providing a bolt/screw having a head with antrotation means that are used with a matching counter-bore geometry for providing a method of locking the bolt/screw head in place as a means to prevent counter-rotation and loss of preload without the need for crimping/deforming the bolt head in the plastic range thereof.

To accomplish this the bolt has a head with high crown tabs that engage equi-spaced detents machined in a counter-bore surface formed on one of the joined plates or parts. The tabs are equi-spaced as are the detents machined on the perimeter surface of the counter-bore to allow rotation of the bolt on torquing but resist rotation when engaged in the detents. A restrainer cone is used to elastically deform the tabs to a smaller diameter which supports installation of the bolt and when removed allows the tabs to fit into the detents to prevent any further rotation. The cone is also used to deform the tabs to allow removal of the bolt without damaging it to allow it to be reused.

From the foregoing it will be seen that one aspect of the present invention is to provide an anti-rotation bolt requiring no permanent deformation to insure anti-rotation.

Another aspect is to provide an anti-rotation bolt capable of being reused.

Yet another aspect is to provide a tool for easily removing an anti-rotational bolt to allow it to be reused These and other aspects of the present invention will be more fully understood after a perusal of the following description of the preferred embodiment when considered with the accompanying drawings.

DESCRIPTION OF THE PREFERRED EMBODIMENT

Figure 1:
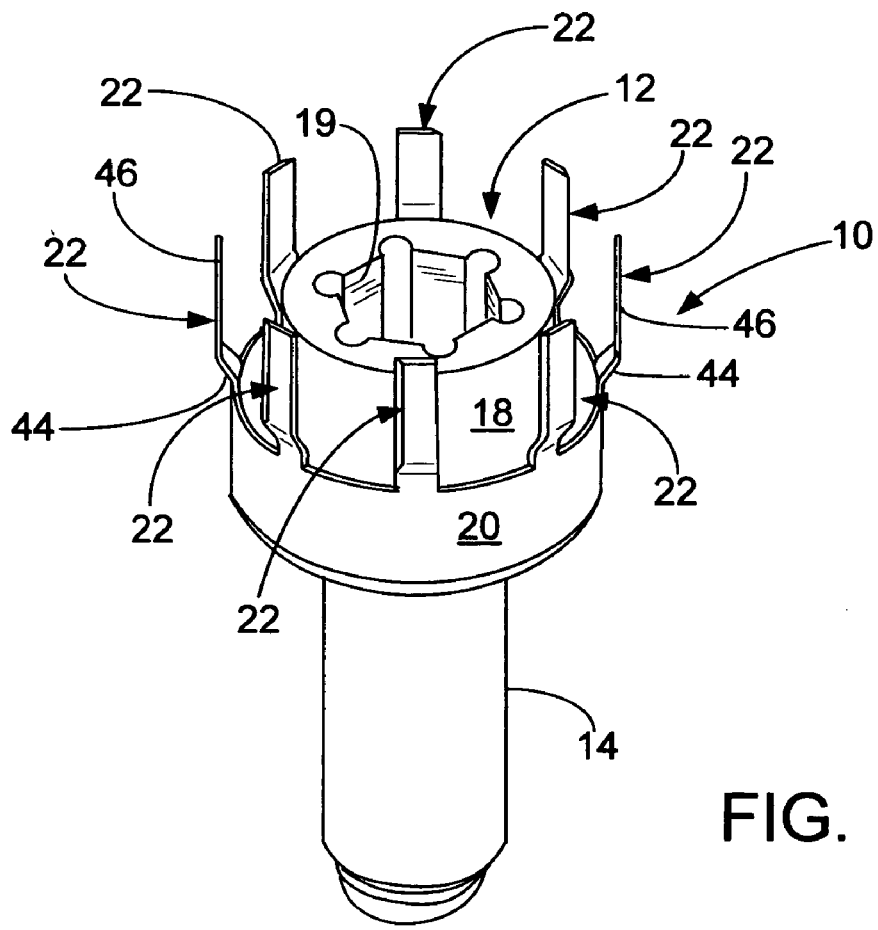
FIG. 1 is a perspective view of the bolt/screw of the present invention.

Referring now generally to the drawings and in particular to FIG. 1, there is shown an integral bolt/locking members (10) generally comprising a bolt head assembly (12) and a threaded locking member (14). As shown, the locking member (14) has a threaded generally cylindrical shape connected to the head assembly (12). The head assembly (12) includes a hex head (18) and a larger diameter head (20) having eight flexible sections (22) located between the locking member (14) and the hex head (18). The hex head (18) is employed for engaging a hex type tightening or driving device for torquing the bolt (10) into a position fastening together two reactor members such as plates. However, other head configurations such star-type heads (not shown) or Phillips-type heads (not shown) may be alternatively employed. Preferably, the locking member (14) is machined from the head portion (20), but it may be a separate piece welded to the head portion of the bolt (10).

For nuclear applications the integral bolt/locking member (10) is preferably fabricated of suitable steel such as an austenitic stainless steel which is a high strength material fabricated of strain hardened type 316 or type 347/348 stainless steel and has minimum yield strength of about 65,000 psi. The bolt (10) may also be fabricated of a nickel base alloy such as Alloy 690 or Alloy X-750 or other suitable alloys. Preferably, the locking member 14 is softened by selectively annealing. E.g., by induction heating or by other suitable means.`

Figure 2:
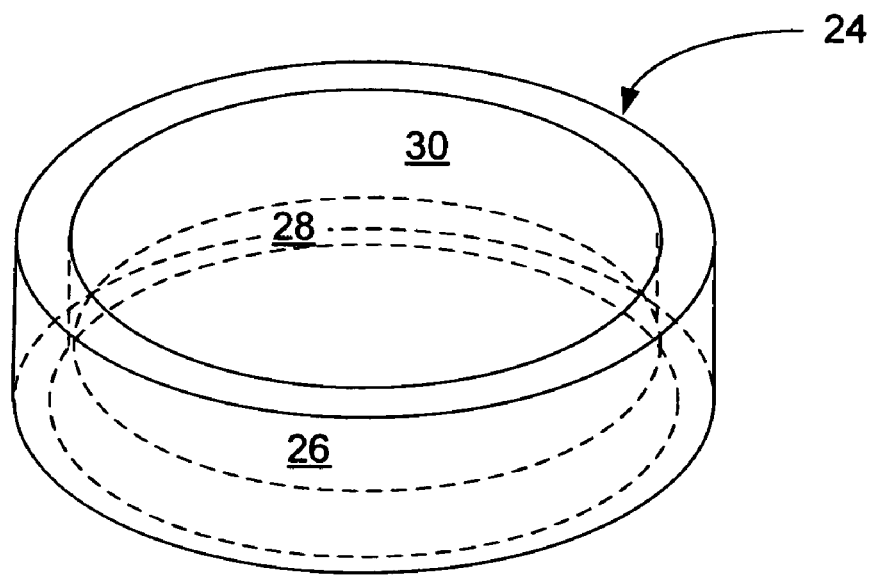
FIG. 2 is a perspective view of the restrainer crown tool for allowing easy installation and removal of the bolt/screw of FIG. 1 for reuse.
Figure 3:
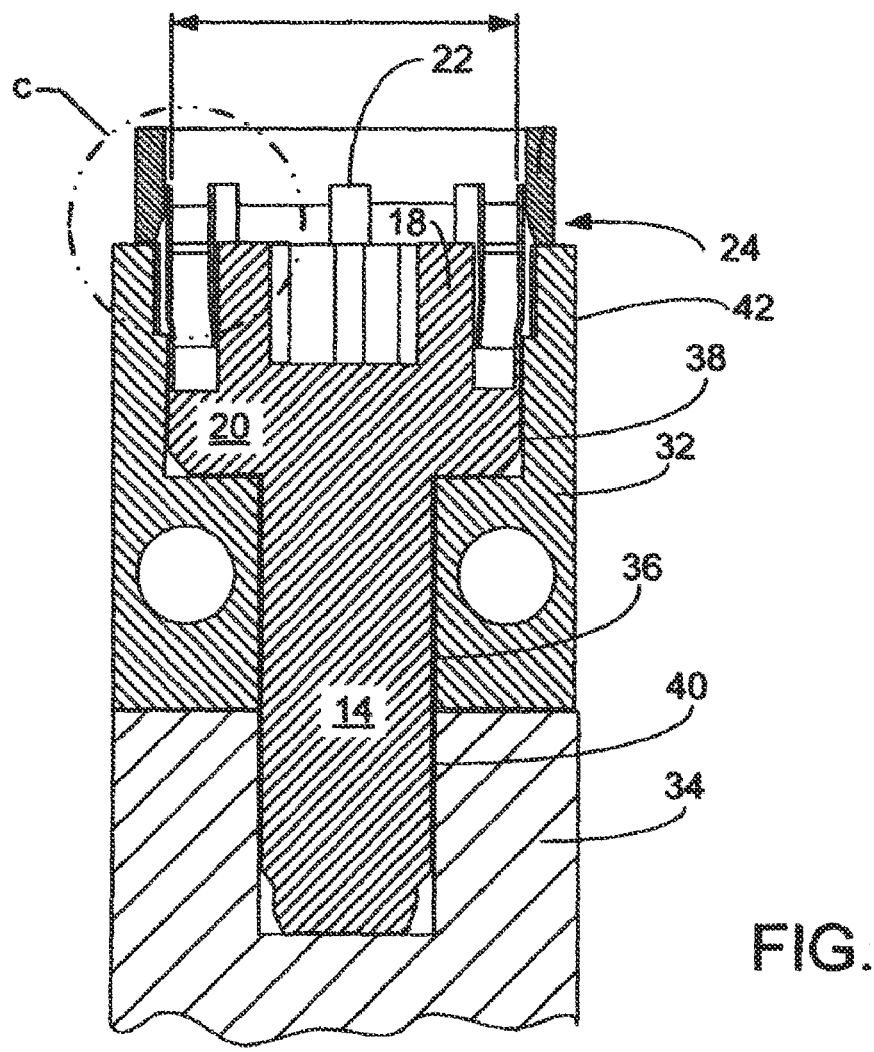
FIG. 3 is a side view of the bolt in FIG. 1 being torqued into a connecting position screwing together two reactor components using the restrainer tool of FIG. 2.
Figure 4:
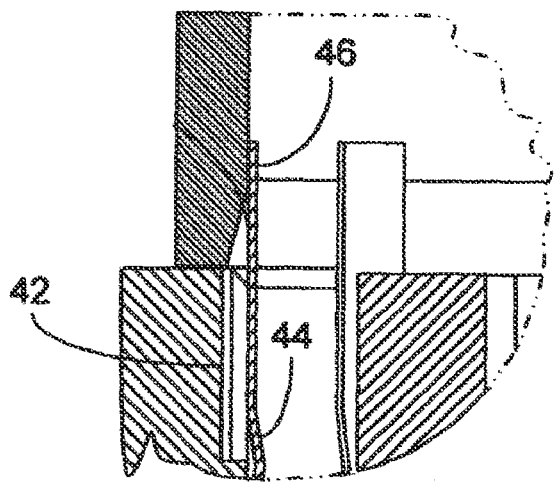
FIG. 4 is an expanded view of section C of FIG. 3.
Figure 5:
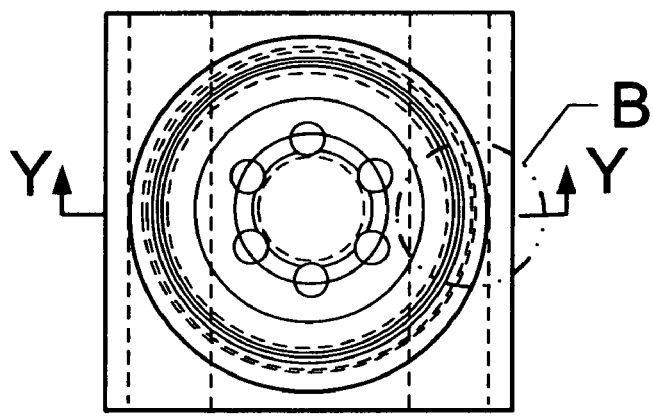
FIG. 5 is a top view of FIG. 3.

FIG. 2 shows a restrainer cone (24) which is a part added to a well known torqueing assembly (not shown) used to torque or screw the bolt (10) into position. The cone (26) is used to restrain the tabs or sections (22) thus preventing their capture in restraining means such as detents formed in the two parts to be assembled which would prevent any further rotation of the bolt (10) into its proper position as will be shown later. The cone (24) has a circular external section (20) and a tapered internal section (28) formed as a wedge at the end of a bottom internal section (30).

Turning now to FIGS. 3-7, the bolt member (10) of FIG. 1 is shown fastening two structural members (32, 34) of a reactor pressure vessel together. The bolt/locking member (10) extends through a threaded bolt hole (36) including a non threaded counter-sunk portion (38) in the first member (36) and an adjacent threaded bolt hole portion (40) in the second member (34).

As was mentioned earlier, the torqueing assembly (not shown) has a member that engages the cavity (19) of the hex head (18) to drive the bolt (10) into engagement with the members (32,34). It also moves the restrainer cone (24) over the tabs (22) by first engaging the angled wedge portion (28) over the tops of the tabs (22) and by pushing down over them drives them unto the straight portion (30) to deflect them away from the wall of the counter-sunk portion (38).

More importantly, the counter-sunk portion (38) has an enlarged top portion (42) where the retainer cone (24) captures the top portions (46) of the tabs (22) extending up from angled bottom portions (44). The tabs (22) are deflected within the elastic range of the tab material with no permanent deflection of the tabs existing. This allows them to spring back to their original shape when the cone (24) is removed.

Figure 6:
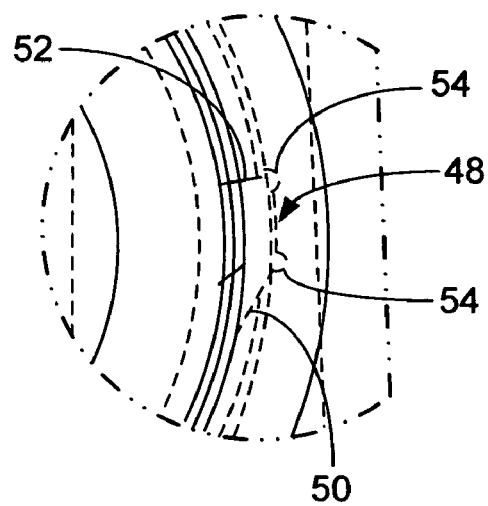
FIG. 6 is an expanded view of detail B of FIG. 5.
Figure 7:
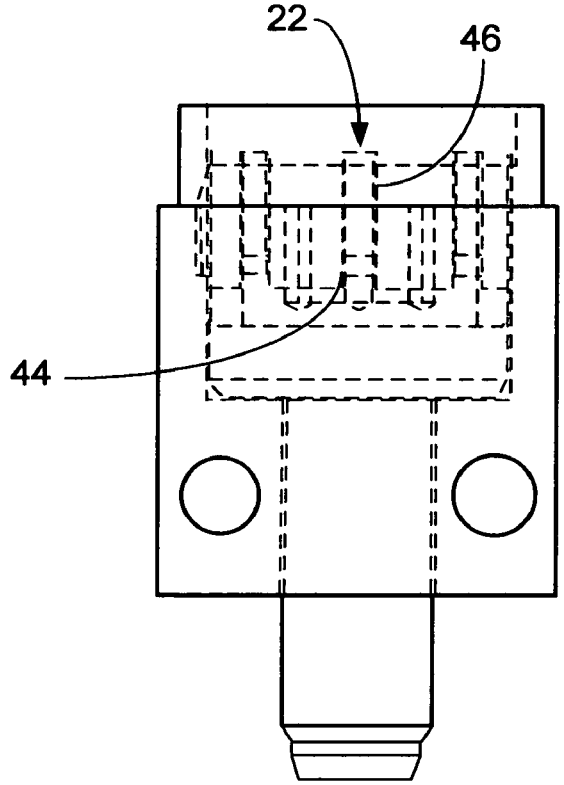
FIG. 7 is a side view FIG. 5 taken along section Y-Y.
Figure 9:
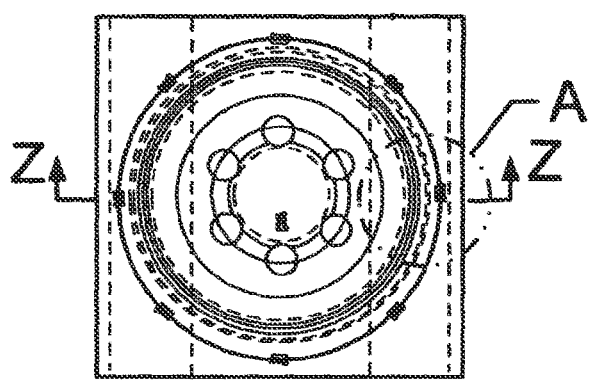
FIG. 9 is top view of FIG. 8.
Figure 8:
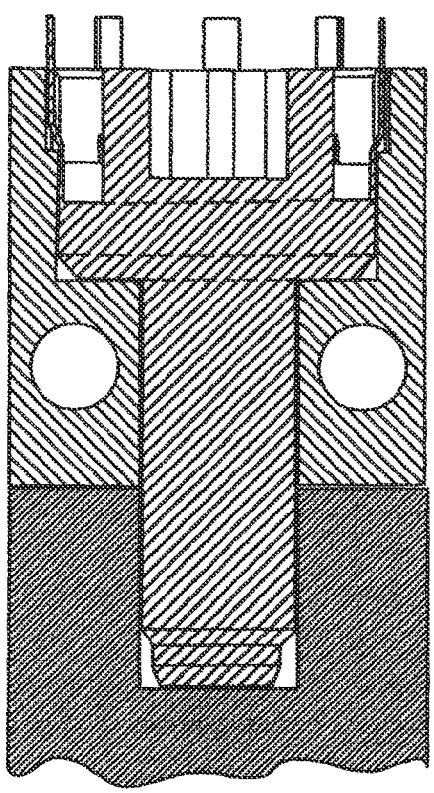
FIG. 8 is a side view of FIG. 3 with the bolt of FIG. 1 in an anti-rotational position with the restraining cone tool and torque tools removed.
Figure 10:
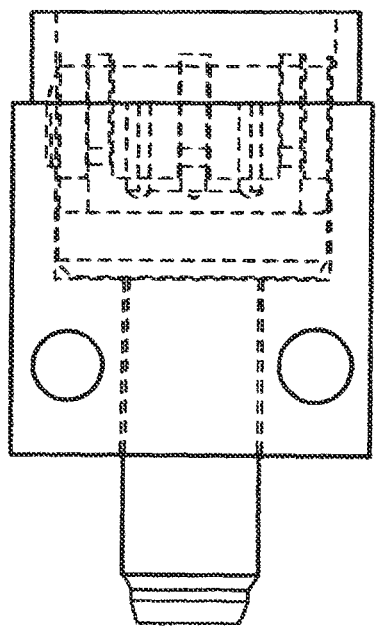
FIG. 10 is a side view of FIG. 8 taken along section Z-Z.
Figure 11:
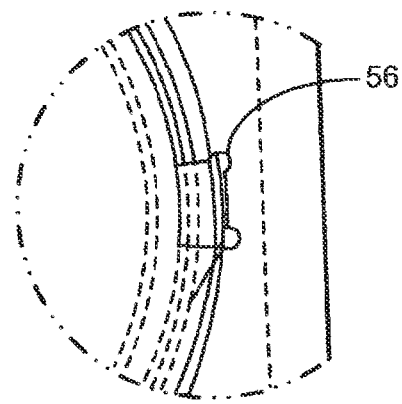
FIG. 11 is an expanded view of detail A of FIG. 9.

As may be best seen in FIG. 6, the counter sunk portion (42) is formed to have eight camed openings or retainers (48) spaced to match the equidistant spacing of the eight tabs (22). Each has an angled inlet (50) and a right angle exit (52) with a detent (54) at each end. The detents are intended to catch the ends of each tab portion (46) therein preventing any further rotation when the bolt (10) is properly torqued in with the tabs (46) aligned with the openings (45) and the cone (24) removed as is seen in FIGS. 8-11.

To remove the bolt (10) the cone (24) is moved unto the installed bolt along with the hex head drive which will now deflect the tabs out of the detents (50) allowing the hex drive to be run inn reverse to remove the bolt without damaging it making it fit for reuse.

From the foregoing it will be seen that the restrainer cone is not a permanent part of the crown bolt or the bolt assembly. The restrainer cone is mounted to the known installation tooling (not shown) which is well within the scope of those working in this art area. The installation tooling provides the method for locating the crown bolt into the threaded hole and torqueing the bolt into its final position. The hex head torque drive is not shown as it is far from being a new method of bolt driving. However, the restrainer cone is the means to push inward the tabs to allow the crown bolt to easily remove without otherwise disturbing the properties of the bolt (no plastic deformation or other destructive alternations). The tabs are deflected within the elastic range of the crown bolt material. This is to say, the tabs are not permanently deformed (plastic deformation) or otherwise changed during the installation or removal (un-installation) process. The crown bolt is therefore capable, from a mechanical viewpoint, of many installation-removal-installation cycles (not withstanding the long term effects of exposure in a high radiation environment).

It will be understood that certain details, obvious modifications and applications have been deleted herein for the sake of conciseness and readability but are fully intended to fall within the scope of the following claims.

We claim:

1. An anti-rotation bolt for fastening together members of a nuclear reactor comprising:
   a threaded shank portion;
   a first head portion attached to said threaded shank portion and having a series of tab members extending there from;
   a second head portion located between said tab members of said first head portion having drive engaging means thereon for torqueing the bolt; and wherein
   said tab members are bendable inwardly to move them out of any engagement with obstructive preventing rotation upon an exerted predetermined force and are returnable to their original position upon removal of said predetermined force;
   the shank portion, first head portion, and second head portion are integral; and
   each of said tab members comprises an angled section extending away from said first head portion and a vertical section extending from said angled section.

2. An anti-rotation bolt as set forth in claim 1 wherein said tab members comprise eight equally spaced members.

3. An anti-rotation bolt as set forth in claim 1 wherein each vertical tab member has one angled side.

4. An anti-rotation bolt as set forth in claim 3 wherein said bolt is made from stainless steel material.

5. An anti-rotation bolt as set forth in claim 3 wherein said bolt is made from austenitic stainless steel or a nickel base alloy.

6. An anti-rotation bolt as set forth in claim 1 including a conical ring section pressed over said tab members in a first position to exert said predetermined force.

7. An anti-rotation bolt as set forth in claim 6 wherein said conical ring section comprises a tubular section having an angled internal surface along a lower section of said tubular section.

8. An anti-rotation bolt as set forth in claim 6 wherein said conical ring section is pressed over said tab members during torqueing of said bolt and is removed there from upon completion.

9. An anti-rotation bolt as set forth in claim 1, wherein said tab members are positioned to retain the first and second head portions in place.

10. An anti-rotation assembly having two parts bolted together comprising:
    a first part having a counter-bore section and a second section extending down there from with a series of detents formed in the walls of the counter-bore section;
    a second part joined to said first part and having a threaded section aligned with the second section of said first part;
    a bolt having a threaded shank section and a first head portion with a series of flexible tab members extending there from and a drive section for driving said bolt into said first and second parts, said bolt further including a second head portion located between said tab members of said first head portion having drive engaging means thereon for torqueing the bolt; and
    retaining cone means for preventing said flexible tabs from engaging the detents of said first part when said bolt is being driven into said threaded section of said second part; and wherein:

said retainer cone means allows said flexible members of said bolt to engage said detents of said first part when said bolt is driven into position in said first and second part joining them together;

said tab members are bendable inwardly to move them out of any engagement with obstructive preventing rotation upon an exerted predetermined force and are returnable to their original position upon removal of said predetermined force; and each of said tab members comprises an angled section extending away from said first head portion and a vertical section extending from said angled section.

11. An assembly as set forth in claim 10 wherein said tab members comprise eight equally spaced members.

12. An assembly as set forth in claim 11 wherein each vertical tab member has one angled side.

13. An assembly as set forth in claim 11 wherein said retainer cone means comprises a conical ring section pressed over said tab members in a first position to exert said predetermined force.

14. An assembly as set forth in claim 13 wherein said conical ring section comprises a tubular section having an angled internal surface along a lower section of said tubular section.

15. An assembly as set forth in claim 14 wherein said conical ring section is pressed over said tab members during torqueing of said bolt and is removed there from upon completion.

* * * * *